(12) United States Patent
Bang et al.

(10) Patent No.: US 8,135,099 B2
(45) Date of Patent: Mar. 13, 2012

(54) METHOD FOR DETECTING TRANSMISSION SYMBOLS IN MULTIPLE ANTENNA SYSTEM

(75) Inventors: Young Jo Bang, Daejeon (KR); Chang Wahn Yu, Daejeon (KR); Seung Jae Bahng, Daejeon (KR); Dae Ho Kim, Daejeon (KR); Youn Ok Park, Daejeon (KR); Jee Hwan Ahn, Daejeon (KR); Il Min Kim, Suwon-si (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 866 days.

(21) Appl. No.: 12/127,342

(22) Filed: May 27, 2008

(65) Prior Publication Data

US 2009/0147894 A1    Jun. 11, 2009

(30) Foreign Application Priority Data

Dec. 11, 2007    (KR) .................. 10-2007-0128430

(51) Int. Cl.
*H04B 1/10* (2006.01)
(52) U.S. Cl. ........ 375/347; 375/349; 375/316; 375/346; 375/260; 375/261; 375/262; 375/267
(58) Field of Classification Search .............. 375/347, 375/349, 316, 346
See application file for complete search history.

(56) References Cited

U.S. PATENT DOCUMENTS

| | | | |
|---|---|---|---|
| 7,535,970 B2 * | 5/2009 | Park et al. ............. | 375/267 |
| 7,720,169 B2 * | 5/2010 | Reuven et al. .......... | 375/267 |
| 7,907,677 B2 * | 3/2011 | Li et al. ............... | 375/267 |
| 2005/0249302 A1 * | 11/2005 | Leshem et al. ......... | 375/267 |
| 2006/0251061 A1 | 11/2006 | Kim et al. | |
| 2007/0086549 A1 | 4/2007 | Kim et al. | |
| 2007/0230628 A1 | 10/2007 | You et al. | |
| 2008/0049862 A1 * | 2/2008 | Dean et al. ............ | 375/267 |
| 2008/0049863 A1 * | 2/2008 | Heiskala .............. | 375/267 |
| 2008/0069262 A1 * | 3/2008 | Prasad et al. .......... | 375/267 |
| 2008/0137782 A1 * | 6/2008 | Bahng et al. .......... | 375/341 |
| 2008/0187066 A1 * | 8/2008 | Wang et al. ........... | 375/267 |
| 2008/0279299 A1 * | 11/2008 | Reuven et al. ......... | 375/267 |

FOREIGN PATENT DOCUMENTS

| | | |
|---|---|---|
| KR | 10-2006-0108450 A | 10/2006 |
| KR | 10-0659281 B1 | 12/2006 |
| KR | 1020070057616 A | 6/2007 |
| KR | 10-2007-0092872 A | 9/2007 |
| WO | 2007/064131 A1 | 6/2007 |

OTHER PUBLICATIONS

Wubben et al., Germany, MMSE-based Lattice-Reduction for Near-ML Detection of MIMO Systems, 2004 ITG Workshop on Smart Antennas, pp. 106-113, 2004, IEEE.

* cited by examiner

*Primary Examiner* — Siu Lee
(74) *Attorney, Agent, or Firm* — Jefferson IP Law, LLP

(57) ABSTRACT

The present invention relates to a transmission symbol detection method in a multiple antenna system. In the present invention, when a channel matrix is estimated through channel estimation, a receiving side calculates a Q matrix and an R matrix through QR decomposition that is more simplified than a typical QR decomposition from an augmented channel matrix that includes the estimated channel matrix. In addition, the receiving side detects symbols having the minimum Euclidean metric by using the two matrixes, as transmission symbols.

6 Claims, 6 Drawing Sheets

METHOD FOR DETECTING TRANSMISSION SYMBOLS IN MULTIPLE ANTENNA SYSTEM

CROSS-REFERENCE TO RELATED APPLICATION

This application claims priority to and the benefit of Korean Patent Application No. 10-2007-0128430 filed in the Korean Intellectual Property Office on Dec. 11, 2007, the entire contents of which are incorporated herein by reference.

BACKGROUND OF THE INVENTION (a) Field of the Invention

The present invention relates to a transmission symbol detection method in a multiple antenna system. Particularly, it relates to a transmission symbol detection method in a multiple antenna system including a plurality of transmitting antennas.

(b) Description of the Related Art

For a mobile communication system such as IEEE 802.16e that uses four transmitting antennas, three usable space-time codes are defined for transmission. The three space-time codes are denoted as three matrixes A, B, and C, and each has a different symbol transmission rate and a different diversity gain. Particularly, the space-time code B has good tradeoff performance in symbol transmission rate and diversity gain, and can be represented as shown in Equation 1.

$$B = \begin{bmatrix} s_1 & -s_2^* & s_5 & -s_7^* \\ s_2 & s_1^* & s_6 & -s_8^* \\ s_3 & -s_4^* & s_7 & s_5^* \\ s_4 & s_3^* & s_8 & s_6^* \end{bmatrix} \quad \text{[Equation 1]}$$

Here, the vertical axis denotes an antenna, and four symbols are simultaneously transmitted from four antennas. The horizontal axis denotes time or carrier frequency.

When symbols are transmitted by using the above-given space-time codes, the symbols are simultaneously received at a receiving side, and therefore the entire performance of the system greatly depends on a detection method of the receiving side. Among many conventional detection methods, the maximum likelihood (ML) detection method results in the best performance.

However, the ML detection method is very complex. Particularly, the ML detection method has a drawback of being incapable of real-time detection since the system complexity increases as the size of the constellation (e.g., 16-QAM or 64-QAM) increases.

Accordingly, in order to reduce system complexity while providing the best performance (i.e., ML performance), a sphere decoding method has been proposed. The sphere decoding method detects constellation points that are close to a received signal, and therefore the system complexity is lower than a simple ML detection method. However, the sphere decoding method has a problem of complexity, and, in the worst case, the sphere decoding method causes exponential functional complexity so that there still exists a problem in application of the sphere decoding method to an actual system.

Therefore, in order to fundamentally decrease the system complexity, methods that can provide suboptimal performance need to be considered, and the methods include zero-forcing (ZF), minimum mean squared error (MMSE), ZF with successive interference cancellation (ZF-SIC), and MMSE with SIC. However, those methods provide suboptimal performance that is more deteriorated than the performance of the ML detection method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmission symbol detection method having advantages of reducing complexity and improving performance.

An exemplary transmission symbol detection method in a multiple antenna system that includes a plurality of transmission antennas according to one embodiment of the present invention includes: estimating a first matrix that is a channel matrix including a plurality of channel gains respectively corresponding to the plurality of transmission antennas by using a received signal; calculating a second matrix that is an upper-triangle matrix and a third matrix that is a unitary matrix from the first matrix; and detecting a plurality of transmission symbols by performing successive interference cancellation (SIC) based on the second and third matrixes. The second matrix includes a first component that corresponds to a first channel gain of the first matrix and a second component that is calculated based on the first channel gain and a second channel gain that is different from the first channel gain as diagonal components. The second matrix further includes a plurality of components using the first channel gain and a plurality of channel gains that are different from the first channel gain.

According to the exemplary embodiment of the present invention, a transmission symbol detection method that can reduce complexity in a receiving side and improve performance can be realized.

DETAILED DESCRIPTION OF THE EMBODIMENTS

Figure 1:
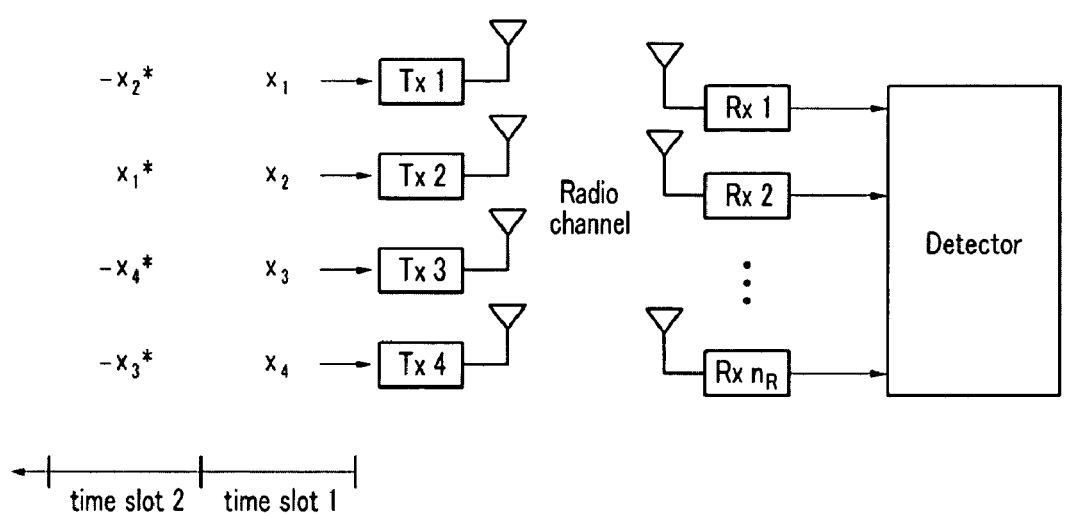
FIG. 1 is a schematic diagram of a system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

signals received at the first and second time-slots in a receiving side are given as Equation 3.

$$r_1^j = h_{j,1}x_1 + h_{j,2}x_2 + h_{j,3}x_3 + h_{j,4}x_4 + n_1^j$$

$$r_2^j = -h_{j,1}x^*_2 + h_{j,2}x^*_1 - h_{j,3}x^*_4 + h_{j,4}x^*_3 + n_2^j \qquad \text{[Equation 3]}$$

Where $h_{j,i}$ denotes a channel gain between the i-th transmitting antenna and the j-th receiving antenna, and $n_t^j$ denotes a white noise at the t-th time slot of the j-th receiving antenna.

A received signal r received at the receiving side can be represented as a matrix as shown in Equation 4.

[Equation 4]

$$r = Hs + n$$

$$r = [\Re[r_1^1], \Im[r_1^1], \Re[r_2^1], \Im[r_2^1], \ldots, \Re[r_1^{n_r}], \Im[r_1^{n_r}], \Re[r_2^{n_r}], \Im[r_2^{n_r}]]^T$$

$$H = \begin{bmatrix} \Re[h_{1,1}] & -\Im[h_{1,1}] & \Re[h_{1,2}] & -\Im[h_{1,2}] & \Re[h_{1,3}] & -\Im[h_{1,3}] & \Re[h_{1,4}] & -\Im[h_{1,4}] \\ \Im[h_{1,1}] & \Re[h_{1,1}] & \Im[h_{1,2}] & \Re[h_{1,2}] & \Im[h_{1,3}] & \Re[h_{1,3}] & \Im[h_{1,4}] & \Re[h_{1,4}] \\ \Re[h_{1,2}] & \Im[h_{1,2}] & -\Re[h_{1,1}] & -\Im[h_{1,1}] & \Re[h_{1,4}] & \Im[h_{1,4}] & -\Re[h_{1,3}] & -\Im[h_{1,3}] \\ \Im[h_{1,2}] & -\Re[h_{1,2}] & -\Im[h_{1,1}] & \Re[h_{1,1}] & \Im[h_{1,4}] & -\Re[h_{1,4}] & -\Im[h_{1,3}] & \Re[h_{1,3}] \\ \vdots & \vdots & \vdots & \vdots & \vdots & \vdots & \vdots & \vdots \\ \Re[h_{n_r,1}] & -\Im[h_{n_r,1}] & \Re[h_{n_r,2}] & -\Im[h_{n_r,2}] & \Re[h_{n_r,3}] & -\Im[h_{n_r,3}] & \Re[h_{n_r,4}] & -\Im[h_{n_r,4}] \\ \Im[h_{n_r,1}] & \Re[h_{n_r,1}] & \Im[h_{n_r,2}] & \Re[h_{1,2}] & \Im[h_{n_r,3}] & \Re[h_{n_r,3}] & \Im[h_{n_r,4}] & \Re[h_{n_r,4}] \\ \Re[h_{n_r,2}] & \Im[h_{n_r,2}] & -\Re[h_{n_r,1}] & -\Im[h_{1,1}] & \Re[h_{n_r,4}] & \Im[h_{n_r,4}] & -\Re[h_{n_r,3}] & -\Im[h_{n_r,3}] \\ \Im[h_{n_r,2}] & -\Re[h_{n_r,2}] & -\Im[h_{n_r,1}] & \Re[h_{1,1}] & \Im[h_{n_r,4}] & -\Re[h_{n_r,4}] & -\Im[h_{n_r,3}] & \Re[h_{n_r,3}] \end{bmatrix}$$

$$s := [\Re[x_1], \Im[x_1], \Re[x_2], \Im[x_2], \Re[x_3], \Im[x_3], \Re[x_4], \Im[x_4]]^T$$

$$=: [s_1, s_2, s_3, s_4, s_5, s_6, s_7, s_8]^T$$

$$n = [\Re[n_1^1], \Im[n_1^1], \Re[n_2^1], \Im[n_2^1], \ldots, \Re[n_1^{n_r}], \Im[n_1^{n_r}], \Re[n_2^{n_r}], \Im[n_2^{n_r}]]^T$$

A transmission symbol detection method in a multiple antenna system that includes a plurality of transmitting antennas according to an exemplary embodiment of the present invention will be described in detail with reference to the drawings.

When four transmitting antennas are used, it is assumed that the time-space code B uses the 4×4 matrix as given in Equation 1, and the third and fourth columns of the 4×4 matrix transmit transmission symbols that are different from transmission symbols transmitted at the first and second columns. Since a receiving terminal receive space-time codes at different time slots or different frequencies, it is assumed that the space-time code includes the first and second columns as shown in Equation 2 for better comprehension and ease of description.

$$X = \begin{bmatrix} x_1 & -x_2^* \\ x_2 & x_1^* \\ x_3 & -x_4^* \\ x_4 & x_3^* \end{bmatrix} \qquad \text{[Equation 2]}$$

With such an assumption, a transmission symbol detection method according to an exemplary embodiment of the present invention will be described in further detail.

FIG. 1 is a schematic diagram of a system according to the exemplary embodiment of the present invention.

It is assumed in FIG. 1 that $n_R$ receiving antennas exist in the receiving terminal (i.e., detector). Under this assumption, Here, r denotes a received signal, H denotes a channel matrix, and n denotes noise. In addition, $\Re[\cdot]$ denotes a real part and $\Im[\cdot]$ denotes an imaginary part. That is, each transmission symbol includes a real part and an imaginary part.

A transmission symbol detection method for the above-stated system model will be described in further detail with reference to equations.

According to the exemplary embodiment of the present invention, a sub-optimal detection method based on minimum mean squared error (MMSE)-zero-forcing successive interference cancellation (ZF-SIC) is used for transmission symbol detection.

To use the suboptimal detection method, an augmented channel matrix $\tilde{H}$ shown in Equation 5 is used. In addition, the augmented channel matrix $\tilde{H}$ is QR-decomposed as shown in Equation 5 so that matrixes $\tilde{Q}$ and $\tilde{R}$ are generated.

$$\tilde{H} := \begin{bmatrix} H \\ \frac{1}{\sqrt{\gamma}} I_{8\times 8} \end{bmatrix} = \tilde{Q}\tilde{R} = \begin{bmatrix} \tilde{Q}_1 \\ \tilde{Q}_2 \end{bmatrix} \tilde{R} \qquad \text{[Equation 5]}$$

Here, $\tilde{Q}$ denotes a $(4n_R+8)\times 8$ unitary matrix, and $\tilde{R}$ is a $(8\times 8)$ upper-triangle matrix. In addition, $\tilde{Q}_1$ is a $(4n_R\times 8)$ sub-matrix of $\tilde{Q}$, and $\tilde{Q}_2$ is a $(8\times 8)$ sub-matrix of $\tilde{Q}$.

Conventionally, the matrixes $\tilde{Q}_1$ and $\tilde{R}$ are calculated by using a numerical method, and the Gram-Schmidt method which is the representative numerical calculation method is used. However, such a numerical calculation method gives good theoretical performance, but it is not appropriate for actual use because an actual output matrix $\tilde{Q}_1$ and an expected unitary matrix may differ from each other. Therefore, a modified Gram-Schmidt scheme is actually applied to the system, but it has a problem of increasing complexity more than the existing Gram-Schmidt scheme. Particularly, the modified Gram-Schmidt scheme should be performed twice to achieve satisfactory performance when a given matrix is ill-conditioned, and, accordingly, complexity is doubled.

Therefore, for solving the numerical calculation method, a method for mathematically calculating the QR decomposition and calculating matrixes $\tilde{Q}_1$ and $\tilde{R}$ by using a closed-form formula according to the exemplary embodiment of the present invention will now be described.

First, assume that $\tilde{h}_i$, i=1, 2, ..., 8, and denotes the i-th column of the matrix $\tilde{H}$. Then the augmented channel matrix $\tilde{H}$ can be represented as Equation 6.

$$\tilde{H} = [\tilde{h}_1, \tilde{h}_2, \tilde{h}_3, \tilde{h}_4, \tilde{h}_5, \tilde{h}_6, \tilde{h}_7, \tilde{h}_8] \qquad \text{[Equation 6]}$$

In addition, the matrix $\tilde{R}$ that is QR-decomposed from the augmented channel matrix $\tilde{H}$ can be represented by using a closed form formula as shown in Equation 7.

$$\tilde{R} = \begin{bmatrix} \tilde{R}_{1,1} & 0 & 0 & 0 & \tilde{R}_{1,5} & \tilde{R}_{1,6} & \tilde{R}_{1,7} & \tilde{R}_{1,8} \\ 0 & \tilde{R}_{2,2} & 0 & 0 & \tilde{R}_{2,5} & \tilde{R}_{2,6} & \tilde{R}_{2,7} & \tilde{R}_{2,8} \\ 0 & 0 & \tilde{R}_{3,3} & 0 & \tilde{R}_{3,5} & \tilde{R}_{3,6} & \tilde{R}_{3,7} & \tilde{R}_{3,8} \\ 0 & 0 & 0 & \tilde{R}_{4,4} & \tilde{R}_{4,5} & \tilde{R}_{4,6} & \tilde{R}_{4,7} & \tilde{R}_{4,8} \\ 0 & 0 & 0 & 0 & \tilde{R}_{5,5} & 0 & 0 & 0 \\ 0 & 0 & 0 & 0 & 0 & \tilde{R}_{6,6} & 0 & 0 \\ 0 & 0 & 0 & 0 & 0 & 0 & \tilde{R}_{7,7} & 0 \\ 0 & 0 & 0 & 0 & 0 & 0 & 0 & \tilde{R}_{8,8} \end{bmatrix} \qquad \text{[Equation 7]}$$

Here, each element of the matrix $\tilde{R}$ can be represented as shown in Equation 8.

$$\tilde{R}_{1,1} = \|\tilde{h}_1\|; \quad \tilde{R}_{1,2} = \frac{1}{\tilde{R}_{1,1}} \tilde{h}_1^T \tilde{h}_2 = 0; \qquad \text{[Equation 8]}$$

$$\tilde{R}_{1,3} = \frac{1}{\tilde{R}_{1,1}} \tilde{h}_1^T \tilde{h}_3 = 0; \quad \tilde{R}_{1,4} = \frac{1}{\tilde{R}_{1,1}} \tilde{h}_1^T \tilde{h}_4 = 0$$

$$\tilde{R}_{1,5} = \frac{1}{\tilde{R}_{1,1}} \tilde{h}_1^T \tilde{h}_5; \quad \tilde{R}_{1,6} = \frac{1}{\tilde{R}_{1,1}} \tilde{h}_1^T \tilde{h}_6;$$

$$\tilde{R}_{1,7} = \frac{1}{\tilde{R}_{1,1}} \tilde{h}_1^T \tilde{h}_7; \quad \tilde{R}_{1,8} = \frac{1}{\tilde{R}_{1,1}} \tilde{h}_1^T \tilde{h}_8$$

$$\tilde{R}_{2,2} = \|\tilde{h}_2\| = \tilde{R}_{1,1}; \quad \tilde{R}_{2,3} = \frac{1}{\tilde{R}_{2,2}} \tilde{h}_2^T \tilde{h}_3 = 0;$$

$$\tilde{R}_{2,4} = \frac{1}{\tilde{R}_{2,2}} \tilde{h}_2^T \tilde{h}_4 = 0; \quad \tilde{R}_{2,5} = \frac{1}{\tilde{R}_{2,2}} \tilde{h}_2^T \tilde{h}_5 = -\tilde{R}_{1,6}$$

$$\tilde{R}_{2,6} = \frac{1}{\tilde{R}_{2,2}} \tilde{h}_2^T \tilde{h}_6 = \tilde{R}_{1,5};$$

$$\tilde{R}_{2,7} = \frac{1}{\tilde{R}_{2,2}} \tilde{h}_2^T \tilde{h}_7 = -\tilde{R}_{1,8}; \quad \tilde{R}_{2,8} = \frac{1}{\tilde{R}_{2,2}} \tilde{h}_2^T \tilde{h}_8 = \tilde{R}_{1,7}$$

$$\tilde{R}_{3,3} = \|\tilde{h}_3\| = \tilde{R}_{1,1} = \tilde{R}_{2,2}; \quad \tilde{R}_{3,4} = \frac{1}{\tilde{R}_{3,3}} \tilde{h}_3^T \tilde{h}_4 = 0;$$

$$\tilde{R}_{3,5} = \frac{1}{\tilde{R}_{3,3}} \tilde{h}_3^T \tilde{h}_5 = \tilde{R}_{1,7} = -\tilde{R}_{2,8}$$

$$\tilde{R}_{3,6} = \frac{1}{\tilde{R}_{3,3}} \tilde{h}_3^T \tilde{h}_6 = \tilde{R}_{1,8} = \tilde{R}_{2,7};$$

$$\tilde{R}_{3,7} = \frac{1}{\tilde{R}_{3,3}} \tilde{h}_3^T \tilde{h}_7 = \tilde{R}_{1,5} = \tilde{R}_{2,6}$$

$$\tilde{R}_{3,8} = \frac{1}{\tilde{R}_{3,3}} \tilde{h}_3^T \tilde{h}_8 = -\tilde{R}_{1,6} = \tilde{R}_{2,5}$$

$$\tilde{R}_{4,4} = \|\tilde{h}_4\| = \tilde{R}_{1,1} = \tilde{R}_{2,2} = \tilde{R}_{3,3};$$

$$\tilde{R}_{4,5} = \frac{1}{\tilde{R}_{4,4}} \tilde{h}_4^T \tilde{h}_5 = -\tilde{R}_{1,8} = \tilde{R}_{2,7} = -\tilde{R}_{3,6}$$

$$\tilde{R}_{4,6} = \frac{1}{\tilde{R}_{4,4}} \tilde{h}_4^T \tilde{h}_6 = -\tilde{R}_{1,7} = \tilde{R}_{2,8} = -\tilde{R}_{3,5};$$

$$\tilde{R}_{4,7} = \frac{1}{\tilde{R}_{4,4}} \tilde{h}_4^T \tilde{h}_7 = \tilde{R}_{1,6} = -\tilde{R}_{2,5} = -\tilde{R}_{3,8}$$

$$\tilde{R}_{4,8} = \frac{1}{\tilde{R}_{4,4}} \tilde{h}_4^T \tilde{h}_8 = \tilde{R}_{1,5} = \tilde{R}_{2,6} = \tilde{R}_{3,7}$$

$$\tilde{R}_{5,5} = \|\tilde{h}_5\|^2 - \frac{1}{\tilde{R}_{1,1}^2}\left( \begin{array}{c} (\tilde{h}_1^T \tilde{h}_5)^2 - (\tilde{h}_2^T \tilde{h}_5)^2 - \\ (\tilde{h}_3^T \tilde{h}_5)^2 - (\tilde{h}_4^T \tilde{h}_5)^2 \end{array} \right)$$

$$\tilde{R}_{6,6} = \|\tilde{h}_6 - (\tilde{q}_1^T \tilde{h}_6)\tilde{q}_1 - (\tilde{q}_2^T \tilde{h}_6)\tilde{q}_2 - (\tilde{q}_3^T \tilde{h}_6)\tilde{q}_3 - (\tilde{q}_4^T \tilde{h}_6)\tilde{q}_4\|^2 = \tilde{R}_{5,5}$$

$$\tilde{R}_{7,7} = \|\tilde{h}_7 - (\tilde{q}_1^T \tilde{h}_7)\tilde{q}_1 - (\tilde{q}_2^T \tilde{h}_7)\tilde{q}_2 - (\tilde{q}_3^T \tilde{h}_7)\tilde{q}_3 - (\tilde{q}_4^T \tilde{h}_7)\tilde{q}_4\|^2 = \tilde{R}_{5,5} = \tilde{R}_{6,6}$$

$$\tilde{R}_{8,8} = \|\tilde{h}_8 - (\tilde{q}_1^T \tilde{h}_8)\tilde{q}_1 - (\tilde{q}_2^T \tilde{h}_8)\tilde{q}_2 - (\tilde{q}_3^T \tilde{h}_8)\tilde{q}_3 - (\tilde{q}_4^T \tilde{h}_8)\tilde{q}_4\|^2 = \tilde{R}_{5,5} = \tilde{R}_{6,6} = \tilde{R}_{7,7}$$

Therefore, the matrix $\tilde{R}$ of Equation 7 can be represented by using a closed-form formula as shown in Equation 9. Equation 8 and Equation 9, which are equations that are newly derived according to the exemplary embodiment of the present invention, can simply calculate the matrix $\tilde{R}$ by reducing the number of matrix elements to be calculated.

$$\tilde{R} = \begin{bmatrix} \tilde{R}_{1,1} & 0 & 0 & 0 & \tilde{R}_{1,5} & \tilde{R}_{1,6} & \tilde{R}_{1,7} & \tilde{R}_{1,8} \\ 0 & \tilde{R}_{1,1} & 0 & 0 & -\tilde{R}_{1,6} & \tilde{R}_{1,5} & -\tilde{R}_{1,8} & \tilde{R}_{1,7} \\ 0 & 0 & \tilde{R}_{1,1} & 0 & -\tilde{R}_{1,7} & \tilde{R}_{1,8} & \tilde{R}_{1,5} & -\tilde{R}_{1,6} \\ 0 & 0 & 0 & \tilde{R}_{1,1} & -\tilde{R}_{1,8} & -\tilde{R}_{1,7} & \tilde{R}_{1,6} & \tilde{R}_{1,5} \\ 0 & 0 & 0 & 0 & \tilde{R}_{5,5} & 0 & 0 & 0 \\ 0 & 0 & 0 & 0 & 0 & \tilde{R}_{5,5} & 0 & 0 \\ 0 & 0 & 0 & 0 & 0 & 0 & \tilde{R}_{5,5} & 0 \\ 0 & 0 & 0 & 0 & 0 & 0 & 0 & \tilde{R}_{5,5} \end{bmatrix} \qquad \text{[Equation 9]}$$

In addition, if $\tilde{q}_i$, i=1, 2, ..., 8, and denotes the i-th column of the matrix $\tilde{Q}_1$, her matrix $\tilde{Q}_1$ can be represented as shown in Equation 10 and each element of the matrix $\tilde{Q}$: can be represented as shown in Equation 11.

$$\tilde{Q}_1 = [\tilde{q}_1, \tilde{q}_2, \tilde{q}_3, \tilde{q}_4, \tilde{q}_5, \tilde{q}_6, \tilde{q}_7, \tilde{q}_8] \qquad \text{[Equation 10]}$$

$$\tilde{q}_1 = \frac{1}{\|\tilde{h}_1\|} \tilde{h}_1 = \frac{1}{\tilde{R}_{1,1}} \tilde{h}_1; \qquad \text{[Equation 11]}$$

-continued $$\tilde{q}_2 = \frac{1}{\tilde{R}_{2,2}}\tilde{h}_2; \tilde{q}_3 = \frac{1}{\tilde{R}_{3,3}}\tilde{h}_3; \tilde{q}_4 = \frac{1}{\tilde{R}_{4,4}}\tilde{h}_4$$

$$\tilde{q}_5 = \frac{1}{\tilde{R}_{5,5}}(\tilde{h}_5 - \tilde{R}_{1,5}\tilde{q}_1 - \tilde{R}_{2,5}\tilde{q}_2 - \tilde{R}_{3,5}\tilde{q}_3 - \tilde{R}_{4,5}\tilde{q}_4)$$

$$\tilde{q}_6 = \frac{1}{\tilde{R}_{6,6}}(\tilde{h}_6 - \tilde{R}_{1,6}\tilde{q}_1 - \tilde{R}_{2,6}\tilde{q}_2 - \tilde{R}_{3,6}\tilde{q}_3 - \tilde{R}_{4,6}\tilde{q}_4)$$

$$\tilde{q}_7 = \frac{1}{\tilde{R}_{7,7}}(\tilde{h}_7 - \tilde{R}_{1,7}\tilde{q}_1 - \tilde{R}_{2,7}\tilde{q}_2 - \tilde{R}_{3,7}\tilde{q}_3 - \tilde{R}_{4,7}\tilde{q}_4)$$

$$\tilde{q}_8 = \frac{1}{\tilde{R}_{8,8}}(\tilde{h}_8 - \tilde{R}_{1,8}\tilde{q}_1 - \tilde{R}_{2,8}\tilde{q}_2 - \tilde{R}_{3,8}\tilde{q}_3 - \tilde{R}_{4,8}\tilde{q}_4)$$

When the matrixes $\tilde{Q}_1$ and $\tilde{R}$ are calculated in the above-described manner, the Equation 2 can be developed as Equation 12 by multiplying both sides of Equation 2 by $\tilde{Q}_1$.

$$\tilde{Q}_1^T r = \tilde{Q}_1^T Hs + \tilde{Q}_1^T n = \tilde{Q}_1^T(\tilde{Q}_1\tilde{R})s + \tilde{Q}_1^T n = \tilde{R}s + \tilde{Q}_1^T n \quad \text{[Equation 12]}$$

Equation 13 can be obtained by applying a minimum Euclidean detection method to the above formula, and a Euclidean metric can be calculated as shown in Equation 14.

$$S^{sol} = \arg\min_{S \in (S_M)^8} \left\| \tilde{Q}_1^T r - \tilde{R}s \right\|^2 \quad \text{[Equation 13]}$$

$$\left\| \tilde{Q}_1^T r - \tilde{R}s \right\|^2 = \|y - \tilde{R}s\|^2 = \quad \text{[Equation 14]}$$
$$(y_8 - \tilde{R}_{8,8}s_8)^2 + (y_7 - \tilde{R}_{7,7}s_7)^2 + (y_6 - \tilde{R}_{6,6}s_6)^2 +$$
$$(y_5 - \tilde{R}_{5,5}s_5)^2 + \left( \begin{array}{c} y_4 - \tilde{R}_{4,4}s_4 - \tilde{R}_{4,5}s_5 - \\ \tilde{R}_{4,6}s_6 - \tilde{R}_{4,7}s_7 - \tilde{R}_{4,8}s_8 \end{array} \right)^2 +$$
$$\left( \begin{array}{c} y_3 - \tilde{R}_{3,3}s_3 - \tilde{R}_{3,5}s_5 - \\ \tilde{R}_{3,6}s_6 - \tilde{R}_{3,7}s_7 - \tilde{R}_{3,8}s_8 \end{array} \right)^2 +$$
$$\left( \begin{array}{c} y_2 - \tilde{R}_{2,2}s_2 - \tilde{R}_{2,5}s_5 - \\ \tilde{R}_{2,6}s_6 - \tilde{R}_{2,7}s_7 - \tilde{R}_{2,8}s_8 \end{array} \right)^2 +$$
$$\left( \begin{array}{c} y_1 - \tilde{R}_{1,1}s_1 - \tilde{R}_{1,5}s_5 - \\ \tilde{R}_{1,6}s_6 - \tilde{R}_{1,7}s_7 - \tilde{R}_{1,8}s_8 \end{array} \right)^2$$

Here, $y = \tilde{Q}_1^T r$ and $y_i$ denote the i-th element of y.

In addition, $S_M$ denotes constellation and can be represented with M-ary pulse amplitude modulation (PAM) defined by Equation 15.

$$S_M := \{-\sqrt{M}+1, -\sqrt{M}+3, \ldots, -1, 1, \ldots, \sqrt{M}-3, \sqrt{M}-1\} \quad \text{Equation 15}$$

Conventionally, symbols ($s_i$, i=1, ..., 8) that minimize Equation 14 (i.e., Euclidean metric) are simultaneously obtained, but according to the exemplary embodiment of the present invention, the third transmission symbol and the last transmission symbol (i.e., $x_3$ and $x_4$) are detected first in order to reduce complexity. That is, real parts and imaginary parts ($s_i$, i=5, ..., 8) of the symbols $x_3$ and $x_4$ that minimize the metric $M_1$ of Equation 16 are detected first.

$$M_1 = (y_8 - \tilde{R}_{8,8}s_8)^2 + (y_7 - \tilde{R}_{7,7}s_7)^2 + (y_6 - \tilde{R}_{6,6}s_6)^2 + (y_5 - \tilde{R}_{5,5}s_5)^2 \quad \text{[Equation 16]}$$

Here, the four terms are independent, and therefore the real parts and the imaginary parts of the symbols $x_3$ and $x_4$ can be detected as shown in Equation 17.

$$\hat{s}_k = \mathcal{P}_{S_M}\left(\frac{y_k}{R_{k,k}}\right), k = 5, 6, 7, 8 \quad \text{[Equation 17]}$$

Here, $\mathcal{P}_{S_M}(\bullet)$ denotes a projection function to the above-defined constellation $S_M$. That is, this function searches for the closest constellation point among all constellation points of the constellation $S_M$.

A real part and an imaginary part ($s_i$, i=1, ..., 4) of each of the transmission symbols $x_1$ and $x_2$ are detected by using Equation 18. That is, the transmission symbols $x_1$ and $x_2$ that minimize the next metric $M_2$ are detected.

$$M_2 = \left( \begin{array}{c} y_4 - \tilde{R}_{4,4}s_4 - \tilde{R}_{4,5}s_5 - \\ \tilde{R}_{4,6}s_6 - \tilde{R}_{4,7}s_7 - \tilde{R}_{4,8}s_8 \end{array} \right)^2 + \quad \text{[Equation 18]}$$
$$\left( \begin{array}{c} y_3 - \tilde{R}_{3,3}s_3 - \tilde{R}_{3,5}s_5 - \\ \tilde{R}_{3,6}s_6 - \tilde{R}_{3,7}s_7 - \tilde{R}_{3,8}s_8 \end{array} \right)^2 +$$
$$\left( \begin{array}{c} y_2 - \tilde{R}_{2,2}s_2 - \tilde{R}_{2,5}s_5 - \\ \tilde{R}_{2,6}s_6 - \tilde{R}_{2,7}s_7 - \tilde{R}_{2,8}s_8 \end{array} \right)^2 +$$
$$\left( \begin{array}{c} y_1 - \tilde{R}_{1,1}s_1 - \tilde{R}_{1,5}s_5 - \\ \tilde{R}_{1,6}s_6 - \tilde{R}_{1,7}s_7 - \tilde{R}_{1,8}s_8 \end{array} \right)^2$$

A real part and an imaginary part ($s_i$, i=1, ..., 4) of each of the transmission symbols $x_1$ and $x_2$ are calculated as shown in Equation 19.

$$\hat{s}_k = \mathcal{P}_{S_M}\left(\frac{y_k - R_{k,5}\hat{s}_5 - R_{k,6}\hat{s}_6 - R_{k,7}\hat{s}_7 - R_{k,8}\hat{s}_8}{R_{k,k}}\right), k = 1, 2, 3, 4 \quad \text{[Equation 19]}$$

Figure 2:
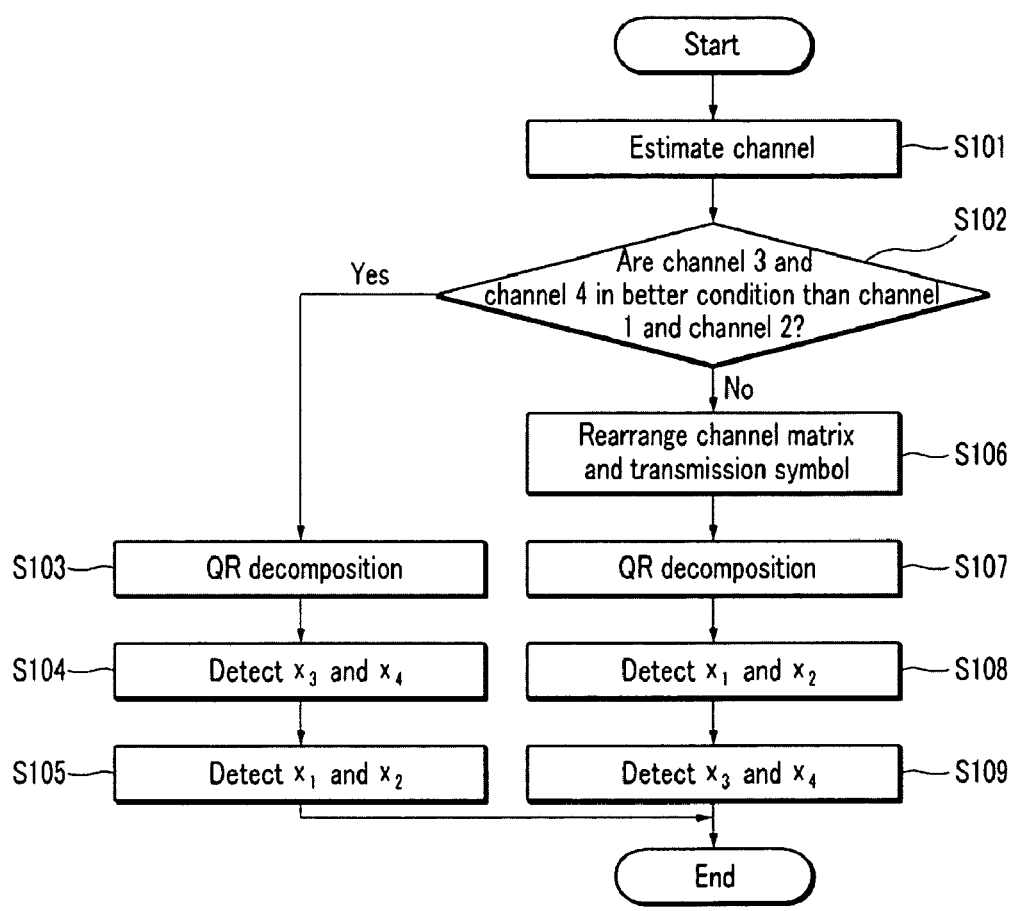
FIG. 2 is a flowchart of a transmission symbol detection method at a receiving side according to the exemplary embodiment of the present invention.

FIG. 2 is a flowchart of a transmission symbol detection method at a receiving side according to the exemplary embodiment of the present invention.

Referring to FIG. 2, when a signal is received through a receiving antenna, a receiving side performs channel estimation by using the received signal in step S101, and generates an augmented channel matrix $\tilde{H}$ that includes an estimated channel matrix H.

In Equation 2, the first two transmission symbols $x_1$ and $x_2$ ($s_1, s_2, s_3, s_4$) are received through channels $h_{k,1}$ and $h_{k,2}$ of the transmitting antenna 1 and the transmitting antenna 2, and other two transmission symbols $x_3$ and $x_4$ ($s_5, s_6, s_7, s_8$) are received through channels $h_{k,3}$ and $h_{k,4}$ of the transmitting antenna 3 and the transmitting antenna 4.

Therefore, the first two transmission symbols $x_1$ and $x_2$ can be more accurately detected when the channels $h_{k,1}$ and $h_{k,2}$ of the transmitting antennas 1 and 2 are in good condition, and the other two transmission symbols $x_3$ and $x_4$ can be more accurately detected when the channel $h_{k,3}$ and $h_{k,4}$ of the transmitting antennas 3 and 4 are in good condition.

Accordingly, when transmission symbol detection is performed in the above-described manner, the third and fourth transmission symbols $x_3$ and $x_4$ should be accurately detected for accurate detection of the first two transmission symbols $x_1$ and $x_2$. When the channels $h_{k,3}$ and $h_{k,4}$ of the transmitting antennas 3 and 4 are in better condition than the channels $h_{k,1}$ and $h_{k,2}$ of the transmitting antennas 1 and transmitting antenna 2, the first two transmission symbols $x_1$ and $x_2$ are detected first and then the other two transmission symbols symbol $x_3$ and $x_4$ are detected from better performance.

The receiving side checks channel condition of each transmission antenna, and determines whether Equation 20 is satisfied (S102).

$$\sum_{k=1}^{n_r} (|h_{k,1}|^2 + |h_{k,2}|^2) \leq \sum_{k=1}^{n_r} (|h_{k,3}|^2 + |h_{k,4}|^2) \qquad \text{[Equation 20]}$$

When Equation 20 is satisfied, the augmented channel matrix $\tilde{H}$ is QR-decomposed on the basis of Equation 8 to 11 (S103), the third and fourth transmission symbols $x_3$ and $x_4$ are detected (S104), and then the first two transmission symbols symbol $x_1$ and $x_2$ are detected by using the detected third and fourth transmission symbols $x_3$ and $x_4$ (S105).

When Equation 20 is not satisfied in step 102, the channel matrix H and a transmission signal vector s are rearranged as shown in Equation 21 in step S106, and the QR decomposition is performed on the augmented channel matrix $\tilde{H}$ that includes the rearranged channel matrix H in step S107. The first two transmission symbols $x_1$ and $x_2$ are detected first in step S108, and the other two transmission symbols $x_3$ and $x_4$ are detected by using the two detected transmission symbols $x_1$ and $x_2$ in step S109.

Figure 3:
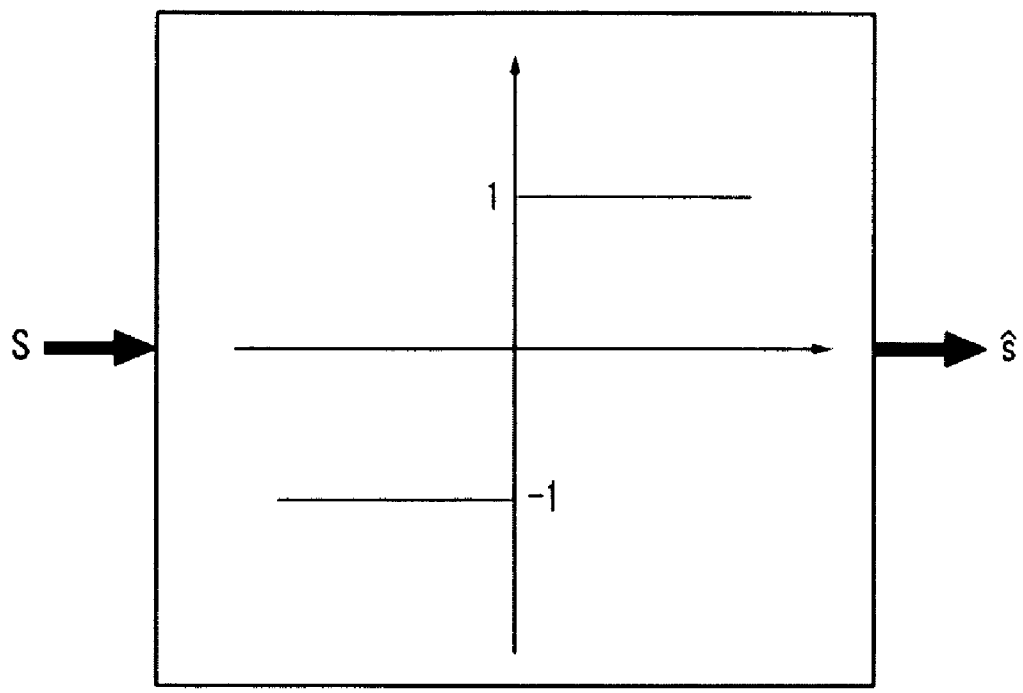
FIG. 3 shows a successive interference cancellation (SIC) detection method in a case of employing a typical BPSK algorithm.

As shown in FIG. 3, when the SIC method is applied, the receiving side detects a transmission symbol by using a received signal, and thus the symbol is determined to be 1 when the received signal s has a value that is greater than 0. Otherwise, the symbol is determined to be −1. The determination value $\hat{s}$ is a detection value of the symbol s, and this symbol detection value is used for the next symbol detection.

When using such an SIC method, previous accurate determination can result in the next accurate determination. However, previous inaccurate determination has a bad influence on the next determination. Particularly, feeding back an inaccurate determination value to the next determination is worse than feeding back nothing at all. For example, assume that the received signal value is +1 but the symbol is determined to −1. In this assumption, the next determination performance may become worse when the inaccurate symbol value (i.e., −1) is fed back to the next determination than when no value (i.e., 0) is fed back to the next determination. In addition, the probability of detecting an inaccurate detection value at the receiving side decreases as an absolute value of the received signal decreases.

Figure 4:
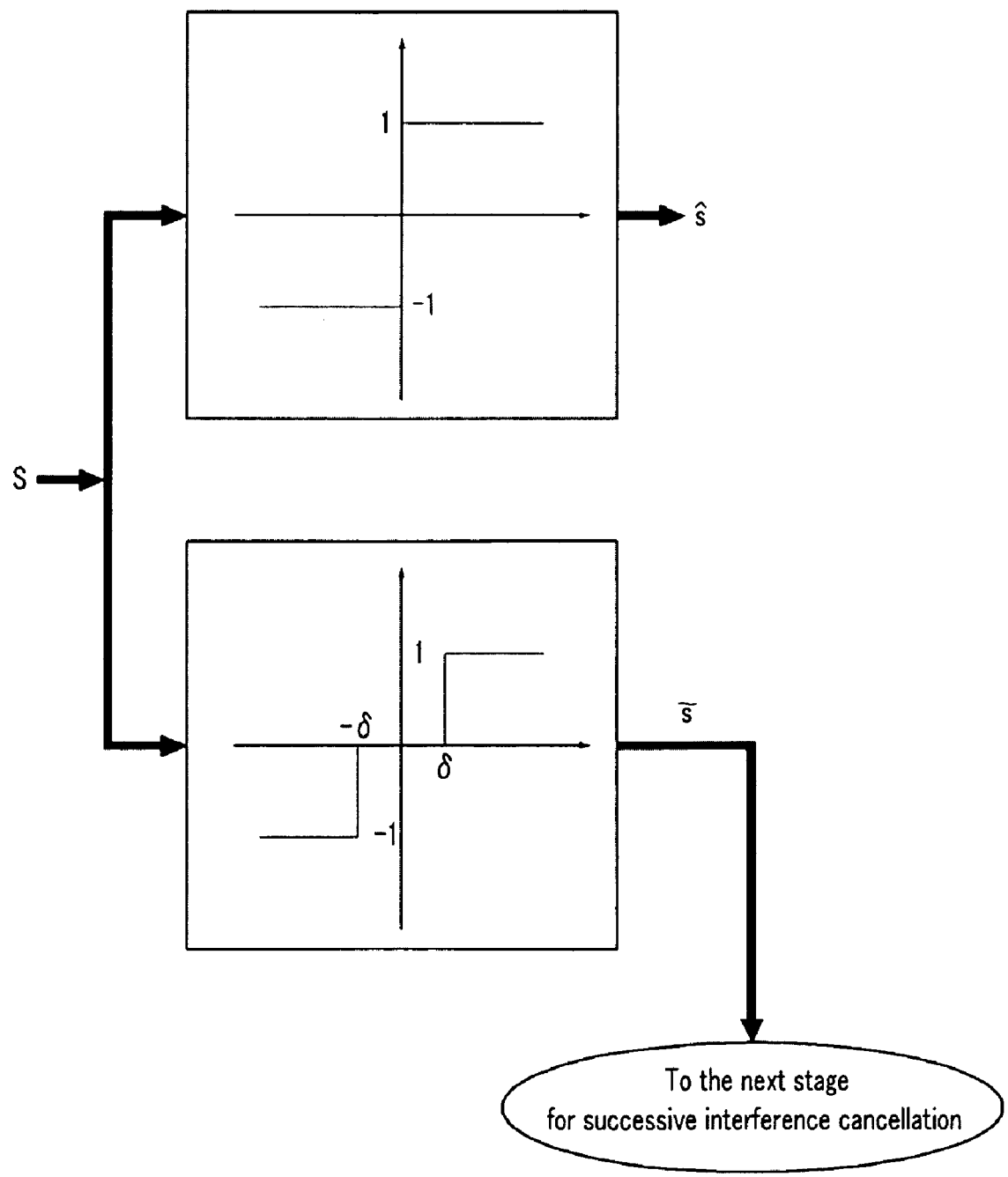
FIG. 4 shows an SIC detection method in case of using a binary phase shift keying (BPSK) algorithm according to an exemplary embodiment of the present invention.

Therefore, in order to improve performance of the SIC method, the determination area is changed as shown in FIG. 4 according to the exemplary embodiment of the present invention. Thus, when an absolute value of a received signal is smaller than a predetermined threshold value in detection

[Equation 21]

$$H' = \begin{bmatrix} \Re[h_{1,3}] & -\Im[h_{1,3}] & \Re[h_{1,4}] & -\Im[h_{1,4}] & \Re[h_{1,1}] & -\Im[h_{1,1}] & \Re[h_{1,2}] & -\Im[h_{1,2}] \\ \Im[h_{1,3}] & \Re[h_{1,3}] & \Im[h_{1,4}] & \Re[h_{1,4}] & \Im[h_{1,1}] & \Re[h_{1,1}] & \Im[h_{1,2}] & \Re[h_{1,2}] \\ \Re[h_{1,4}] & \Im[h_{1,4}] & -\Re[h_{1,3}] & -\Im[h_{1,3}] & \Re[h_{1,2}] & \Im[h_{1,2}] & -\Re[h_{1,1}] & -\Im[h_{1,1}] \\ \Im[h_{1,4}] & -\Re[h_{1,4}] & -\Im[h_{1,3}] & \Re[h_{1,3}] & \Im[h_{1,2}] & -\Re[h_{1,2}] & -\Im[h_{1,1}] & \Re[h_{1,1}] \\ \vdots & \vdots & \vdots & \vdots & \vdots & \vdots & \vdots & \vdots \\ \Re[h_{n_r,3}] & -\Im[h_{n_r,3}] & \Re[h_{n_r,4}] & -\Im[h_{n_r,4}] & \Re[h_{n_r,1}] & -\Im[h_{n_r,1}] & \Re[h_{n_r,2}] & -\Im[h_{n_r,2}] \\ \Im[h_{n_r,3}] & \Re[h_{n_r,3}] & \Im[h_{n_r,4}] & \Re[h_{1,4}] & \Im[h_{n_r,1}] & \Re[h_{n_r,1}] & \Im[h_{n_r,2}] & \Re[h_{n_r,2}] \\ \Re[h_{n_r,4}] & \Im[h_{n_r,4}] & -\Re[h_{n_r,3}] & -\Im[h_{1,3}] & \Re[h_{n_r,2}] & \Im[h_{n_r,2}] & -\Re[h_{n_r,1}] & -\Im[h_{n_r,1}] \\ \Im[h_{n_r,4}] & -\Re[h_{n_r,4}] & -\Im[h_{n_r,3}] & \Re[h_{1,3}] & \Im[h_{n_r,2}] & -\Re[h_{n_r,2}] & -\Im[h_{n_r,1}] & \Re[h_{n_r,1}] \end{bmatrix}$$

$$s' := [\Re[x_3], \Im[x_3], \Re[x_4], \Im[x_4], \Re[x_1], \Im[x_1], \Re[x_2], \Im[x_2]]^T$$

$$=: [s'_1, s'_2, s'_3, s'_4, s'_5, s'_6, s'_7, s'_8]^T$$

In Equation 21, a channel gain order included in the channel matrix H and a location of a transmission symbol included in the transmission signal ( ) are reversed.

Figure 5:
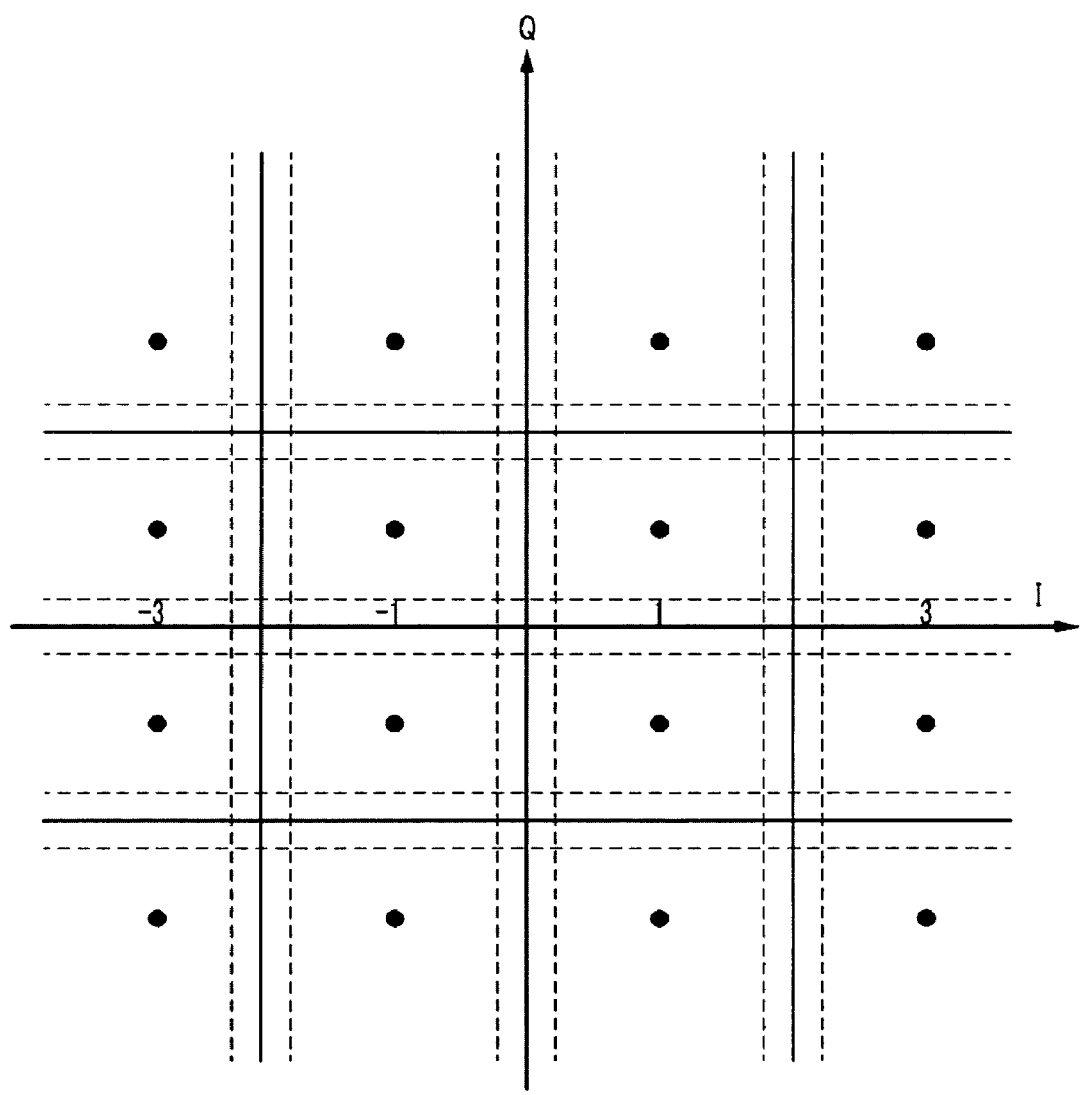
FIG. 5 shows a determination area for a feedback detection value determination when the SIC detection method is applied to 16-QAM according to the exemplary embodiment of the present invention.

With reference to FIG. 3 to FIG. 5, an improved transmission symbol detection method will now be described in more detail.

FIG. 3 shows a typical SIC method in a case of using a binary phase shift key (BPSK) method, and FIG. 4 shows an SIC method in a case of using a BPSK method according to the exemplary embodiment of the present invention. FIG. 5 shows a determination area for determining a feedback detection value when the SCI method is applied to 16-QAM according to the exemplary embodiment of the present invention.

In the exemplary embodiment of the present invention, a successive interference cancellation (SIC) method is used for transmission symbol detection.

FIG. 3 shows a case of using a BPSK method as an exemplary use of the SIC method.

value determination, 0 rather than the detection value is fed back. That is, the actual detection value is fed back only when it is greater than the threshold value. In FIG. 4, δ denotes the threshold value, $\hat{s}$ denotes the actual detection value, and $\tilde{s}$ denotes a value that is fed back to the next determination.

Although FIG. 3 and FIG. 4 show the case of using the BPSK modulation method, the present invention can be applied to M-QAM modulation, and FIG. 5 shows a determination area used for determining a detection value to be fed back when the SIC method is applied to 16-QAM. As shown in FIG. 5, when a received signal exists inside dotted lines, the receiving side uses a value given as a solid line between two dotted lines as a feedback value instead of using an actually detected value.

As described, when detection values ($\tilde{s}_k$, =1, 2, ..., 8) are determined for all transmission symbols, all the detection values, excluding $\tilde{s}_8$, are substituted to Equation 17 so as to detect the imaginary part $s_8$ of $x_4$ as shown in Equation 22.

$$\hat{s}_8 = \mathcal{P}_{S_M}\left(\frac{y_8\tilde{R}_{8,8} + u_{8,4}\tilde{R}_{4,8} + u_{8,3}\tilde{R}_{3,8} + u_{8,2}\tilde{R}_{2,8} + u_{8,1}\tilde{R}_{1,8}}{\sqrt{\tilde{R}_{8,8}^2 + \tilde{R}_{4,8}^2 + \tilde{R}_{3,8}^2 + \tilde{R}_{2,8}^2 + \tilde{R}_{1,8}^2}}\right)$$ [Equation 22]

$$u_{8,4} = y_4 - \tilde{R}_{4,4}\tilde{s}_4 - \tilde{R}_{4,5}\tilde{s}_5 - \tilde{R}_{4,6}\tilde{s}_6 - \tilde{R}_{4,7}\tilde{s}_7$$

$$u_{8,3} = y_3 - \tilde{R}_{3,3}\tilde{s}_3 - \tilde{R}_{3,5}\tilde{s}_5 - \tilde{R}_{3,6}\tilde{s}_6 - \tilde{R}_{3,7}\tilde{s}_7$$

$$u_{8,2} = y_2 - \tilde{R}_{2,2}\tilde{s}_2 - \tilde{R}_{2,5}\tilde{s}_5 - \tilde{R}_{2,6}\tilde{s}_6 - \tilde{R}_{2,7}\tilde{s}_7$$

$$u_{8,1} = y_1 - \tilde{R}_{1,1}\tilde{s}_1 - \tilde{R}_{1,5}\tilde{s}_5 - \tilde{R}_{1,6}\tilde{s}_6 - \tilde{R}_{1,7}\tilde{s}_7$$

When the imaginary part $s_8$ of $x_4$ is detected, all the detection values, excluding $\hat{s}_7$, are substituted to Equation 17 so as to detect the real part $s_7$ of $x_4$. In the same manner as above, the real part and the imaginary part $s_6$ and $s_5$ of the candidate vector $x_3$ are detected.

In addition, remaining transmission symbols are detected by using Equation 23.

$$\hat{s}_k = \mathcal{P}_{S_M}\left(\frac{y_k - R_{k,5}\tilde{s}_5 - R_{k,6}\tilde{s}_6 - R_{k,7}\tilde{s}_7 - R_{k,8}\tilde{s}_8}{R_{k,k}}\right), k = 1, 2, 3, 4.$$ [Equation 23]

Until now, the transmission symbols have been detected by performing the detection process once at the receiving side. However, according to the exemplary embodiment of the present invention, the above-described transmission symbol detection process is iteratively performed at the receiving side so as to detect more accurate transmission symbols.

Figure 6:
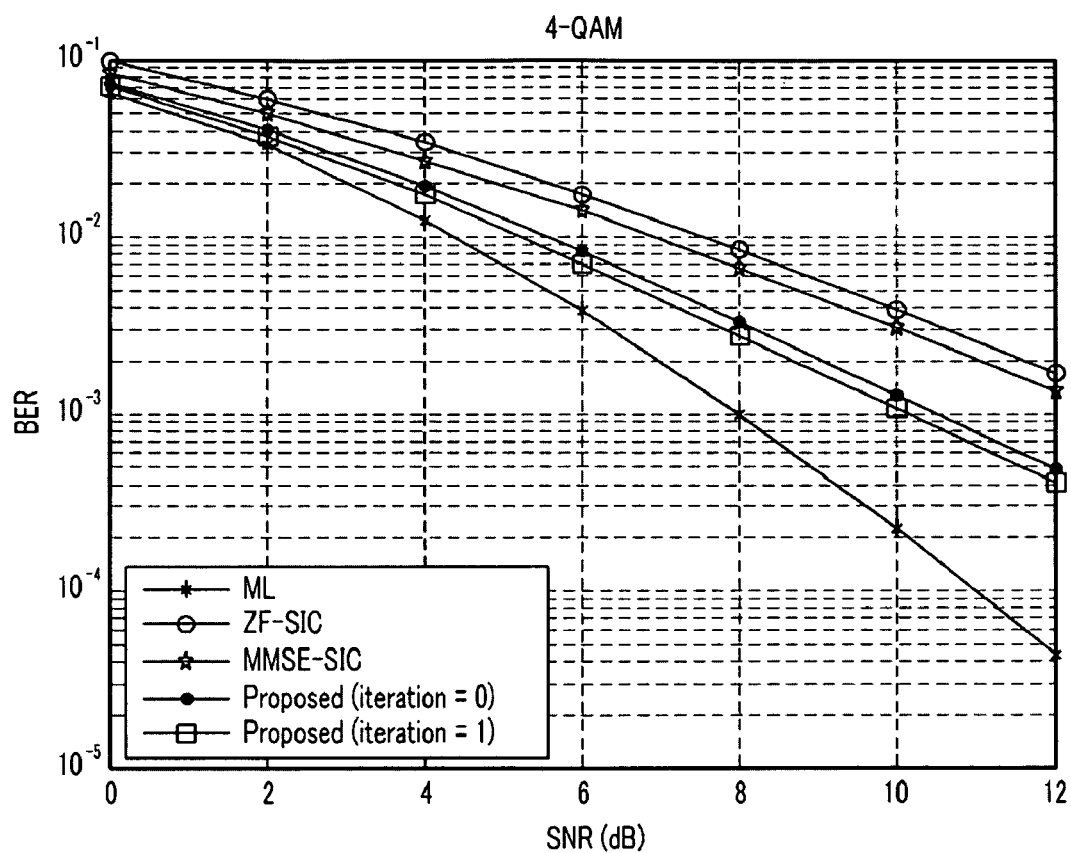
FIG. 6 compares a bit error rate (BER) of the transmission detection method according to the exemplary embodiment of the present invention and a typical ZF-SIC and MMSE-SIC method.

FIG. 6 shows an exemplary comparison result of a bit error rate (BER) between the transmission symbol detection method according to the exemplary embodiment of the present invention and typical ZF-SIC and MMSE-SIC methods. In this example, two receiving antennas and 4-QAM are used.

FIG. 6 shows that the transmission symbol detection method (i.e., proposed method) according to the exemplary embodiment of the present invention results in performance that is much closer to the ML detection method that the conventional detection methods (i.e., (ZF-SIC and MMSE-SIC). For example, in the BER of $10^{-3}$, performance of the proposed method is improved by 2 dB with zero iteration and 2.5 dB with one iteration.

The following Table 1 compares the amount of calculation in the two cases with the assumption of using two transmitting antennas and QPSK. One case uses the transmission symbol detection method (proposed) according to the exemplary embodiment of the present invention, and the other case uses typical ZF-SIC and MMSE-SIC methods.

TABLE 1

| Method | Floating point Addition/Subtraction | Floating point Multiplication | Floating point Division | Floating point Square root calculation | Total CPU cycles |
|---|---|---|---|---|---|
| ZF-SIC | 560 | 604 | 72 | 8 | 7492 |
| MMSE-SIC | 1072 | 1116 | 136 | 8 | 13,892 |
| Proposed(iter = 0) | 144 | 154 | 20 | 2 | 1934 |
| Proposed(iter = 1) | 276 | 286 | 40 | 6 | 3706 |

As shown in Table 1, the transmission symbol detection method according to the exemplary embodiment of the present invention requires much less calculation compared to the conventional methods (i.e., ZF-SIC and MMSE-SIC). For example, compared to the MMSE-SIC method, the proposed method requires an amount of CPU calculation of 14% with no iteration and requires an amount of CPU calculation of 27% with one iteration. That is, the proposed method according to the exemplary embodiment of the present invention can provide better performance with low complexity compared to the existing detection methods.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmission symbol detection method of a multiple antenna system including a plurality of transmission antennas, the method comprising:
    estimating a first matrix comprising a channel matrix including a plurality of channel gains respectively corresponding to the plurality of transmission antennas by using a received signal;
    calculating a second matrix comprising an upper-triangle matrix and a third matrix comprising a unitary matrix from the first matrix; and
    detecting a plurality of transmission symbols by performing successive interference cancellation (SIC) based on the second and third matrixes,
    checking a channel condition of each of the plurality of transmission antennas; and
    determining a detection order of the plurality of transmission symbols based on the channel condition,
    wherein the second matrix comprises a first component and a second component as diagonal components, where the first component corresponds to a first channel gain of the first matrix and the second component is calculated based on the first channel gain and on a second channel gain that is different from the first channel gain, and the second matrix further comprises a plurality of components determined by using the first channel gain and a plurality of channel gains that are different from the first channel gain,
    wherein the plurality of transmission symbols corresponds to a first symbol group including a pair of first and second symbols and a second symbol group including a pair of third and fourth symbols,
    wherein the determining of the detection order detects the first symbol group first before the second symbol group when a channel condition of the first symbol group is determined to be better than a channel condition of the second symbol group and comprises detecting of a plurality of transmission symbols that represent a minimum Euclidean metric by using the second and third matrixes, and
    wherein the detecting of the plurality of transmission symbols comprises detecting the first symbol group that minimizes a first metric and detecting the second symbol group that minimizes a second metric.

2. The method of claim 1, wherein the determining of the detection order further comprises rearranging the first matrix and a transmission signal based on the detection order.

3. The method of claim 1, wherein the detecting of the plurality of transmission symbols further comprises:
   detecting a plurality of detection values through successive interference cancellation (SIC);
   re-detecting the plurality of detection values by using the plurality of detection values; and
   detecting the plurality of transmission symbols by iteratively performing the re-detecting of the plurality of detection values.

4. The method of claim 3, wherein the detecting of the plurality of detection values comprises:
   detecting a first detection value that includes at least one value among first, second, and third values based on an absolute value of the received signal; and
   detecting a second detection value by using the first detection value.

5. The method of claim 3, wherein the detecting of the plurality of detection values comprises:
   checking a location of the received signal within a determination area that includes a plurality of areas respectively corresponding to the plurality of detection values and a plurality of boundaries respectively partitioning the plurality of areas;
   determining a value that corresponds to a location of a boundary as a detection value when the received signal is placed within a predetermined area from the corresponding boundary; and
   determining a value of an area where the received signal is placed outside the predetermined area from the corresponding boundary.

6. The method of claim 1, wherein the second and third matrixes are obtained by QR-decomposing the first matrix.

* * * * *